United States Patent [19]
Campbell et al.

[11] 3,878,113
[45] Apr. 15, 1975

[54] POLYPHENYLENE SULFIDE BONDED SOLID FILM LUBRICANT

[75] Inventors: Mahlon E. Campbell, Overland Park, Kans.; William D. Walker, Independence, Mo.

[73] Assignee: Midwest Research Institute, Kansas City, Mo.

[22] Filed: Mar. 14, 1973

[21] Appl. No.: 341,303

[52] U.S. Cl. .................................................. 252/12
[51] Int. Cl. ..... C10m 7/40; C10m 7/06; C10m 7/02
[58] Field of Search ........... 252/12, 12.2, 12.4, 12.6

[56] References Cited
UNITED STATES PATENTS

| | | | |
|---|---|---|---|
| 3,285,850 | 11/1966 | Graham | 252/12 |
| 3,354,129 | 11/1967 | Edmonds et al. | 260/37 R |
| 3,567,504 | 3/1971 | Hopkins et al. | 252/12 |
| 3,592,783 | 7/1971 | Edmonds | 252/12 |
| 3,730,893 | 5/1973 | Bilow et al. | 252/12 |

*Primary Examiner*—Daniel E. Wyman
*Assistant Examiner*—I. Vaughn
*Attorney, Agent, or Firm*—D. A. N. Chase

[57] ABSTRACT

A relatively thick, solid film lubricant comprising a polyphenylene sulfide binder having a finely divided, solid phase lubricating material dispersed throughout the binder, wherein the polyphenylene sulfide polymer has a chain of from 6 to 12 recurring $C_6H_4$—S units in its initial state prior to curing. The lubricant layer is heat cured on the surface of a bearing substrate to advance the polymerization of the binder to an infusible state in which the binder is resistant to thermal degradation at useful temperatures in air on the order of 1000° F. The thickness of the layer may be from 0.001 to 0.01 inch without flaking under load.

6 Claims, No Drawings

POLYPHENYLENE SULFIDE BONDED SOLID FILM LUBRICANT

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This invention relates to improvements in organically bonded solid film lubricants and, in particular, to a high temperature lubricant which may be applied in a thick layer to the surface of a bearing substrate.

Historically, organically bonded solid film lubricants have been known to exhibit longest wear lives when applied as very thin films limited in thickness to approximate 0.0005 inch. Although, as compared with inorganically bonded solid film lubricants the organically bonded film is preferred for its wear life at lower operating temperatures (generally under 400° F.), still these thin organically bonded films have a relatively short life since there is very little material available to lubricate the bearing surface. If thicker film layers are attempted, the organically bonded films have a tendency to flake off thereby materially reducing the effective wear life.

On the other hand, inorganically bonded films (including those bonded with ceramics) are used successfully at higher operating temperatures and at coating thicknesses of 0.002 inch. However, these inorganically bonded films tend to be very brittle and are easily chipped from the substrate surface. For these reasons, selection of a binder in a solid film application is oftentimes a matter of compromise depending upon the operating conditions to be encountered.

From the standpoint of optimization of the solid film as a lubricating technique, it is desired to have a film that could be applied to bearing surfaces in sufficient thicknesses that the film itself would act as a bearing insert, or at least exhibit wear qualities similar to a bearing insert. Heretofore, this has been accomplished using dry lubricants only through the employment of lubricant composites rather than films per se.

It is, therefore, an important object of the present invention to provide a solid film lubricant that may be applied as a relatively thick layer on a bearing substrate, wherein such layer has sufficient structural strength to maintain its integrity under operating conditions when subjected to load. As a corollary to the foregoing object, it is an important aim of this invention to provide a solid film lubricant as aforesaid which is organically bonded and resistant to flaking from the substrate surface at film thicknesses well in excess of 0.001 inch.

Another important object of the present invention is to provide an organically bonded solid film lubricant as aforesaid having superior high temperature characteristics which render the lubricant useful at temperatures that may be on the order of 1000° F.

Still another important object of this invention is to provide a solid film lubricant as aforesaid employing a polyphenylene sulfide composition as the binder cured to a state of final polymerization in which the composition is resistant to thermal degradation at useful temperatures in air on the order of 1000° F.

Furthermore, it is a broad objective of the present invention to provide a solid film lubricant that increases in wear life with increased film thickness without structural failure and is usable over a broad range of film thicknesses, in order to produce a film lubricant having wear life characteristics similar to solid lubricant composites.

In general, the function of the lubricant to be described herein is to provide a coating which may be applied to bearing surfaces and which has a low friction coefficient and advantageous wear properties over a wide range of conditions, i.e. load, speed, temperature, and ambient gas pressure. The principle involved is to interpose a lubricating film between mating bearing surfaces by bonding the film to one or more of the mating surfaces. The film lubricant serves to reduce friction and extend bearing life over a wide range of temperatures, including elevated temperatures beyond the operating capability of most organically bonded films. The films of the present invention may be used with bearings which are intended to operate under hostile environments for extended periods of time, examples being bearings in jet aircraft, spacecraft, business machines, furnaces, fabric-handling equipment, hand appliances and toys. The films also find general use in gear applications where the presence of oils or liquids might be objectionable.

In the present invention, polyphenylene sulfide is utilized as the organic binder in the solid film lubricant and is characterized by the recurring structural unit

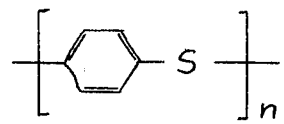

where $n$ is from 6 to 12 prior to curing the polymer to advance the polymerization to a final, infusible state. The production of polyphenylene sulfide polymers is fully described in U.S. Pat. No. 3,354,129, issued Nov. 21, 1967, the disclosure of such patent being incorporated herein by reference as may be required for a full and complete understanding of the processes of making the polyphenylene sulfide employed in this invention.

In general, the polymer is prepared by reacting a polyhalo-substituted cyclic compound with an alkali metal sulfide in a polar organic compound at an elevated temperature. An example of specific compounds (set forth in Example I in the aforesaid patent) is the reaction of p-dichlorobenzene with sodium sulfide in N-methyl-pyrrolidone. Numerous examples of other suitable polyhalo-substituted compounds, alkali metal sulfides, and polar organic compounds are also disclosed in the aforesaid patent. Reaction conditions are controlled to limit polymerization to the formation of a structural chain having the number of recurring units within the range set forth above. The resulting polymer (in the form of a fine powder) recovered from the reaction, where an excess of alkali metal sulfide is used, is represented by the following:

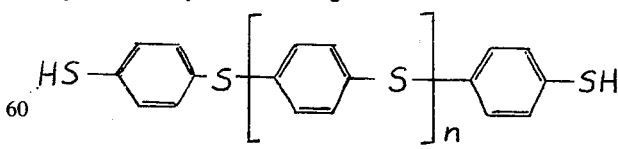

where $n$ is from 6 to 12.

Polyphenylene sulfide is a crystalline aromatic polymer with a symmetrical, rigid backbone chain which, as may be observed above, consists of para-substituted benzene rings connected by a single sulfur atom between rings. With a chain of from 6 to 12 recurring $C_6H_4$-S units, the polymer is in a heat-curable state and has a melting point of 550° F. (288° C.). In such state the polymer is insoluble in common solvents below 400° F. This will be referred to herein as the initial state of the polymer, prior to curing as will be described hereinafter.

In accordance with the present invention, in order to provide a liquid coating composition for application to a substrate, the polyphenylene sulfide powder is first admixed with a finely divided, solid phase lubricating material. The resulting dry mixture is then admixed with a suitable carrier such as alcohol or water. Being insoluble, a suspension is formed by mechanical mixing. A film of this suspension is then applied to bearing surfaces by spraying, brushing or dipping. Alcohol is preferred as the carrier since less problems with bubble formation are encountered in the curing of the coating composition on the bearings.

The lubricating material may comprise any of a number of powdered lubricating pigments such as molybdenum disulfide ($MoS_2$), graphite, powdered metals, and antimony trioxide ($Sb_2O_3$). A mixture of $MoS_2$ (preferably approximately 40 microns) and $Sb_2O_3$ (chemically pure 200 mesh powder) is preferred in the present invention in the percentages by weight of 55% $MoS_2$ and 45% $Sb_2O_3$. The exact percentages may vary from application to application, but the quantity of $MoS_2$ should be 50% or more for the longest wear life.

The ratio by weight of the lubricating pigments to the polyphenylene sulfide binder is relatively high, on the order of 5:1 in terms of dry solids prior to mixing the dry powdered ingredients with the liquid carrier. Accordingly, it may be appreciated that the lubricating pigments are by far the major proportion by weight of the film lubricant of the present invention, yet the film maintains its structural integrity when applied as a heavy layer having a thickness of over 0.001 inch as will be discussed in detail hereinafter.

A preferred form comprises dry ingredients in the ratio of five parts by weight lubricating pigments to one part polyphenylene sulfide binder. The lubricating pigments are $MoS_2$ and $Sb_2O_3$ in the preferred ratio of 55 $MoS_2$ to 45% $Sb_2O_3$. The test results to follow were obtained in all instances using this formulation, with the exception of those tests in which the lubricant to binder ratio was varied to illustrate the effect on wear life.

As the test results will illustrate, the polyphenylene sulfide bonded film may be applied in a relatively thick layer in excess of 0.001 inch, with an enhancement in wear life being obtained as film thickness increases. A total thickness of the lubricating layer on the order of 0.01 inch is possible without flaking. Once applied, the coating composition is cured using an initial bake of 200° F. for 1 hour to evaporate the liquid carrier, followed by an optimum bake at 700° F. for one-half hour to advance the polymerization of the polyphenylene sulfide to a final, infusible state. Polymerization is advanced through chain propagation and cross-linking, resulting in a thermoset state in which the binder is resistant to thermal degradation at useful temperatures in air on the order of 1000° F.

A standard Falex tester was employed to conduct screening tests to determine the optimum lubricant to binder ratio discussed hereinabove, as well as to conduct film thickness studies. The tester employed two V-block jaws loaded against a rotating pin having a diameter of one-fourth inch. Both the pin and the V-blocks were coated with the solid lubricant film to present coated bearing components. The pin and V-block materials, speed and load are as indicated in notes accompanying the tables to follow. The testing environment was air at the prevailing pressure and room temperature.

For the standard Falex tests Table I shows the effect on wear life of varying the lubricant to binder (L/B) ratio. It is evident that the 5:1 ratio is by far superior in terms of average wear life. Table II illustrates the increasing average wear life with pin film thickness up to 0.0025 inch.

TABLE I

FALEX WEAR-LIFE TESTS
VARYING L/B RATIOS

Pin Material: AISI 3135 Steel    Load: 1,000 lb. Jaw
V-Block Material: AISI 1137 Steel    Speed: 290 rpm = 19 ft/min

| L/B Ratio | | Avg. Wear Life (min) |
|---|---|---|
| 1:0.10 | | 234[a] |
| 1:0.15 | | 305[a] |
| 1:0.18 | | 465[a] |
| 1:0.20 | | 465[b] |
| 1:0.22 | | 462[a] |
| 1:0.25 | | 240[a] |
| 1:0.30 | | 216[a] |
| 1:0.35 | | 174[c] |
| 1:0.40 | (high friction) | 35[a] |
| 1:0.50 | (high friction) | 10[a] |

[a] Three tests.
[b] Six tests.
[c] Seven tests.

TABLE II

FALEX WEAR-LIFE TESTS
THICKNESS EFFECT

Pin Material: AISI 3135 Steel    Load: 455 Kg (1,000 lb) Jaw
V-Block Material: AISI 1137 Steel    Speed: 290 rpm = 19 ft/min

| Pin Film Thickness (in) | Avg. Wear Life (min)[a] |
|---|---|
| 0.0008 in | 445 |
| 0.0017 in | 480 |
| 0.0025 in | 505 |

[a] Averages of at least three tests.

TABLE III

FALEX WEAR-LIFE TESTS - HIGH TEMPERATURE

Load: As noted    Test temperature as noted
Speed: 100 rpm - 6.54 fpm    Curing temperature 700° F. - One hour

| No. of Tests | Test Temp. (°F) | Test Load (lb) | Average Wear Life (min) |
|---|---|---|---|
| 5[a] | 200 | 500 | 1,562 |
| 6[a] | 200 | 700 | 946 |
| 6[a] | 200 | 1,000 | 747 |
| 7[a] | 400 | 500 | 1,010 |
| 6[a] | 400 | 700 | 836 |
| 5[a] | 400 | 1,000 | 569 |
| 8[a] | 600 | 500 | 786 |
| 6[b] | 600 | 700 | 655 |
| 5[a] | 600 | 1,000 | 387 |
| 5[b] | 800 | 500 | 110 |
| 5[b] | 800 | 700 | 80 |
| 5[b] | 800 | 1,000 | 75 |

[a] Test specimens - pins AISI 3135, V-Blocks AISI 1137 Steel.
[b] Test specimens - pins AISI 4130, V-Blocks AISI 4130 Steel.

A high temperature Falex tester was employed to evaluate the film at temperatures up to 800° F. These results are set forth in Table III. Besides varying the operating temperature, tests were conducted at load levels of 500, 700 and 1,000 pounds jaw load on the Falex machine. As temperature increased, load increases had less effect on the wear life.

Similar tests at 600° F. were conducted at these three load levels at speeds of 20, 60 and 100 rpm corresponding to 1.3, 3.9 and 6.5 feet per minute (fpm). These results appear in Table IV in terms of average wear life expressed in time (minutes) and in feet of bearing surface traveled. It may be appreciated from Table IV that the average wear life remains substantial at 600° F. even at the highest test speed and load.

The effect of curing temperature and time on the average wear life of the film is illustrated in Table V. As discussed hereinabove, optimum cure for the preferred coating composition is attained in air at 700° F. for a period of 30 minutes. The curing time at the high temperature (that advances the polymerization of the binder) is purposely limited in duration to enhance the wear life of the cured film. A comparison of the wear life performance of the film cured at 700° F. for 1 hour with the optimum cure at 700° F. for 30 minutes shows an increase in average wear life of over 50%. Excessive curing temperatures and longer times tend to degrade the lubricating pigments through oxidation. On the other hand, curing temperatures under the 550° F. melting point of the polyphenylene sulfide are generally unsatisfactory.

A series of high speed, low load journal bearing tests were also conducted to evaluate wear and friction coefficient, and to verify the structural qualities of the polyphenylene sulfide bonded film when employed as a relatively thick solid lubricant layer exceeding a thickness of 0.001 inch. These results are set forth in Table VI for a shaft having a diameter of five-eighths inch turning within a bushing, both components being coated with the preferred formulation of the film of the present invention at the initial film thicknesses indicated. Throughout all of these tests the films maintained their structural integrity and did not flake off or separate from the underlying substrate. All tests were run until failure occurred.

TABLE IV

FALEX WEAR-LIFE TESTS AT 600° F.

Load: Variable  
Speed: Variable

Test Specimens:  
Pins - 4340 Steel $R_c 45$  
V-Blocks - 4340 Steel $R_c 45$

| No. of Tests | Test Speed (fpm) | Test Load (lb) | Average Wear Life min. | ft. |
|---|---|---|---|---|
| 5 | 1.3 | 500 | 1,596 | 2,075 |
| 5 | 3.9 | 500 | 586 | 2,285 |
| 5 | 6.5 | 500 | 1,050 | 6,825 |
| 5 | 1.3 | 700 | 2,136 | 2,777 |
| 5 | 3.9 | 700 | 856 | 3,338 |
| 6 | 6.5 | 700 | 655 | 4,258 |
| 5 | 1.3 | 1,000 | 1,530 | 2,000 |
| 5 | 3.9 | 1,000 | 657 | 2,562 |
| 5 | 6.5 | 1,000 | 465 | 3,022 |

TABLE V

HIGH TEMPERATURE FALEX TESTS  
EFFECT OF CURING TEMPERATURE

Test Temperature: 600° F.  
Speed: 100 rpm–9.82 fpm (3/8 in. diameter pin)  
Load: 500 lb. Jaw load  
Specimen Material: Stainless Steel

| Curing Temperature °F | Average Film Thickness in. | Average Friction Coefficient | Average Wear Life min. |
|---|---|---|---|
| 200 1 hr + 500 1 hr | 0.0013 | 0.011 | 156[a] |
| 200 1 hr + 550 1 hr | 0.0022 | 0.016 | 274[a] |
| 200 1 hr + 600 1 hr | 0.0018 | 0.013 | 197[a] |
| 200 1 hr + 650 1 hr | 0.0019 | 0.012 | 180[a] |
| 200 1 hr + 700 1 hr | 0.0015 | 0.029 | 385[a] |
| 200 1 hr + 750 1 hr | 0.0018 | 0.026 | 169[a] |
| 200 1 hr + 800 1 hr | 0.0012 | 0.025 | 112[a] |
| 200 1 hr + 700 15 min | 0.0013 | 0.011 | 317[b] |
| 200 1 hr + 700 30 min | 0.0016 | 0.017 | 581[c,d] |

[a] Average of three tests.  
[b] Average of seven tests.  
[c] Average of five tests.  
[d] Load carrying test on this film failed at greater than 909 Kg (2,000 lb) Jaw load.

It is especially significant in Table VI to note that, in general, the test duration increases and the wear factor decreases with greater film thicknesses. For example, referring to the tests at 30 psi load and 900 rpm, the bushing film thickness of 0.0045 inch in conjunction with a film thickness of 0.0029 on the shaft produced a significantly increased wear life and reduced wear factor as compared with the other tests at this load and speed. Similarly, a dramatic increase in the test duration (and hence wear life) may be seen in the tests run at a load of 120 psi and a speed of 900 rpm. Here most favorable results were obtained when the film thickness on the bushing was initially 0.0065 inch, and 0.0054 on the shaft. The effect of the thick film of the present invention is likewise demonstrated in the tests at a load of 60 psi and a speed of 1800 rpm, where the film thickness on the shaft in one of the tests was 0.0045 inch.

In Table VI, the wear factor is expressed as $K \times 10^{-10}$. By definition, $$K = r/PVT$$

where  
$r$ = radial wear in inches  
$P$ = load in psi (projected area)  
$V$ = velocity in feet per minute  
$T$ = time in hours The psi load is computed on the basis of the total projected area of the bushing, the load being applied by a dead weight on the bushing component.

Table VII sets forth sliding friction and wear-life data for tests conducted on an oscillatory slider friction and wear machine. Such machine consists of a wear block which is loaded against a flat oscillating plate. Both the block and the plate are coated with the film. The wear block is held against the opposing face of the oscillating plate, and is restrained by a linkage equipped with a strain gauge which is used to measure the frictional force between the block and the plate. The wear block is loaded against the plate by a dead weight and lever system. The film thickness on both components in all tests averaged approximately 0.003 inch.

A special evaluation was also conducted to determine the usefulness of the film of the present invention as a solid lubricant for titanium alloys. Titanium surfaces have been difficult to bond to using solid film lubricants, but the film of the present invention performed well as set forth in Table VIII. One comparative test as indicated was made using a polyimide bonded film, and illustrates the greatly enhanced wear life obtained using the polyphenylene sulfide bonded film even at operating temperatures of 600° to 800° F.

In summary, the advantages and features of the present invention include the following:

TABLE VI

JOURNAL BEARING TESTS

| Load psi | Speed | Film Thickness (in) Shaft | Film Thickness (in) Bushing | Test Duration Hrs | Wear Factor $K \times 10^{-10}$ | Average Friction Coefficient |
|---|---|---|---|---|---|---|
| 30 | 900 rpm (147 fpm) | 0.0029 | 0.0045 | 143.3 | 111 | 0.07 |
| 30 | do. | 0.0026 | 0.0032 | 40.7 | 323 | 0.06 |
| 30 | do. | 0.0030 | 0.0014 | 47.5 | 210 | 0.04 |
| 60 | do. | 0.0038 | 0.0033 | 184.5 | 43 | 0.09 |
| 60 | do. | 0.0030 | 0.0011 | 124.8 | 37 | 0.05 |
| 60 | do. | 0.0030 | 0.0012 | 113.4 | 40 | 0.05 |
| 120 | do. | 0.0054 | 0.0065 | 184.9 | 18 | 0.04 |
| 120 | do. | 0.0036 | 0.0019 | 84.8 | 37 | 0.04 |
| 120 | do. | 0.0021 | 0.0016 | 69.6 | 29 | 0.03 |
| 240 | 900 rpm (147 fpm) | 0.0029 | 0.0016 | 13.9 | 92 | 0.04 |
| 240 | do. | 0.0038 | 0.0016 | 23.3 | 66 | 0.05 |
| 240 | do. | 0.0035 | 0.0015 | 10.9 | 130 | 0.07 |
| 30 | 1,800 rpm (294 fpm) | 0.0030 | 0.0021 | 86.8 | 67 | 0.08 |
| 30 | do. | 0.0021 | 0.0017 | 39.6 | 109 | 0.07 |
| 30 | do. | 0.0018 | 0.0009 | 74.2 | 41 | 0.06 |
| 60 | do. | 0.0045 | 0.0018 | 115.0 | 31 | 0.05 |
| 60 | do. | 0.0029 | 0.0035 | 41.8 | 87 | 0.10 |
| 60 | do. | 0.0019 | 0.0010 | 47.7 | 34 | 0.05 |
| 120 | do. | 0.0038 | 0.0019 | 24.88 | 65 | 0.10 |
| 120 | do. | 0.0014 | 0.0012 | 22 | 33 | 0.05 |
| 120 | do. | 0.0041 | 0.0018 | 36.8 | 45 | 0.08 |
| 240 | 1,800 rpm (294 fpm) | 0.0029 | 0.0015 | 4.8 | 130 | 0.06 |
| 240 | do. | 0.0035 | 0.0018 | 2.4 | 313 | 0.07 |
| 240 | do. | 0.0027 | 0.0032 | 2.6 | 322 | 0.08 |
| 450 | do. | 0.0021 | 0.0018 | 3.5 | 84 | 0.10 |
| 30 | 3,600 rpm (588 fpm) | 0.0029 | 0.0015 | 12.9 | 193 | 0.04 |
| 30 | do. | 0.0021 | 0.0020 | 12.44 | 183 | 0.08 |
| 30 | do. | 0.0016 | 0.0036 | 1.5 | 1,965 | 0.12 |

TABLE VII

SLIDING FRICTION AND WEAR-LIFE TESTS

Test Conditions:
Temperature - ambient
Atmosphere - air
Curing temperature - 200°F - 1 hr + 550°- 1 hr Test Specimens:
Osc. plate - 4340 Steel R$_c$45
Wear block - 4340 Steel R$_c$45

| Speed fpm | Load psi | Friction Coefficient | Rubbing Distance ft | Wear Life min |
|---|---|---|---|---|
| 12 | 1,500 | 0.08–0.1 | 28,344 | 2,362 |
| 12 | 3,000 | 0.06–0.1 | 18,576 | 1,548 |
| 12 | 6,000 | 0.05–0.1 | 19,440 | 1,620 |
| 24 | 1,500 | 0.1–0.15 | 33,600 | 1,400 |
| 24 | 3,000 | 0.05–0.10 | 14,520 | 605 |
| 24 | 6,000 | 0.05–0.1 | 22,176 | 927 |
| 36 | 1,500 | 0.08–0.17 | 20,340 | 565 |
| 36 | 3,000 | 0.05–0.15 | 21,924 | 609 |
| 36 | 6,000 | 0.05–0.15 | 25,668 | 713 |

1. The polyphenylene sulfide binder material in its initial state is a dry powder at normal atmospheric conditions. Therefore, special storage of the film ingredients is not required.

2. The binder material, being essentially insoluble in its initial state, does not go into solution but is in suspension with the lubricating materials in the liquid carrier.

3. The coating composition has outstanding shelf life in both powder and slurry forms.

4. Subsequent to curing, the polyphenylene sulfide binder is infusible and is resistant to thermal degradation at useful temperatures in air on the order of 1000° F. After being cured at or somewhat above the fusion temperature of the initial state polymer, the polyphenylene sulfide binder protects the powdered lubricating

TABLE VIII

FALEX WEAR-LIFE TESTS
Specimen Material - 6Al-4V Titanium

| Speed rpm | Speed fpm | Jaw Load Lbs | Temperature (F) | Film Thickness On Pin | Average Wear Life In Min |
|---|---|---|---|---|---|
| 290 | 19 | 300 | room (no heat added) | 0.0013 | 641 |
| 290 | 19 | 300 | room (no heat added) | 0.0003 | 253[1] |
| 100 | 6.55 | 500 | 400 | 0.0024 | 1,160 |
| 100 | 6.55 | 500 | 600 | 0.0025 | 347 |
| 100 | 6.55 | 500 | 800 | 0.0019 | 30 |

[1] Test on polyimide bonded film for comparative purposes. This film is designated MLR-2 in U.S. Patent No. 3,567,504, and is by weight 2 parts lubricant (55% MoS$_2$ + 45% Sb$_2$O$_3$) and 1 part polyimide binder.

pigments from rapid oxidation at elevated temperatures.

5. The film lubricant has increased wear life with increasing film thickness without loss of structural integrity. Accordingly, thick films may be employed utilizing the lubricant of the present invention, thereby approaching the advantages normally obtainable only in lubricant composites but with the attributes of simplicity characteristic of film lubricants.

6. The lubricant may be applied to rougher substrate surfaces due to the significantly increased layer thickness obtainable, thus less surface pretreatment is required.

Having thus described the invention, what is claimed as new and desired to be secured by Letters Patent is:

1. A solid film lubricant adhered to a bearing surface, said lubricant comprising a dry layer of finely divided, solid phase lubricating pigments dispersed throughout a polyphenylene sulfide binder, said pigments and said binder being present in major and minor proportions by weight respectively with the weight ratio being such as to provide the solid film lubricant with a relatively low friction coefficient and long wear life, said lubricant in a volatile carrier being coated on said surface with said binder in an initial, heat-curable state and cured on said surface by heating the lubricant to remove said carrier, and advancing the polymerization of said binder to a final, infusible state by further heating the lubricant to at least approximately 550° F. for a time period limited in duration to an extent to enhance the useful wear life of said layer, said pigments being resistant to thermal degradation at the curing temperatures, said binder having the recurring unit

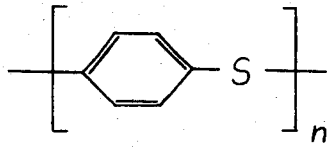

wherein n in said initial state is from 6 to 12.

2. The lubricant as claimed in claim 1, wherein said layer is characterized by the property of being resistant to flaking throughout a range of thickness of approximately 0.001 to 0.01 inch.

3. The lubricant as claimed in claim 1, wherein said weight ratio of pigments to binder is in the range of approximately 3:1 to approximately 10:1.

4. The lubricant as claimed in claim 3, wherein said pigments comprise $MoS_2$ and $Sb_2O_3$ present in a ratio by weight of $MoS_2$ to $Sb_2O_3$ of at least 1:1.

5. The lubricant as claimed in claim 1, wherein said advancement of the polymerization of the binder to said final state is effected at a temperature of approximately 550° to approximately 700° F.

6. A solid film lubricant adhered to a bearing surface, said lubricant comprising a dry layer at least 0.001 inch in thickness of finely divided, solid phase lubricating pigments dispersed throughout a polyphenylene sulfide binder, said pigments and said binder being present in major and minor proportions by weight respectively with the weight ratio being such as to provide the solid film lubricant with a relatively low friction coefficient and long wear life, said lubricant in a volatile carrier being coated on said surface with said binder in an initial, heat-curable state and cured on said surface by heating the lubricant to remove said carrier, and advancing the polymerization of said binder to a final, infusible state by further heating the lubricant to at least approximately 550° F. for a time period limited in duration to an extent to enhance the useful wear life of said layer, said pigments being resistant to thermal degradation at the curing temperatures, said binder being

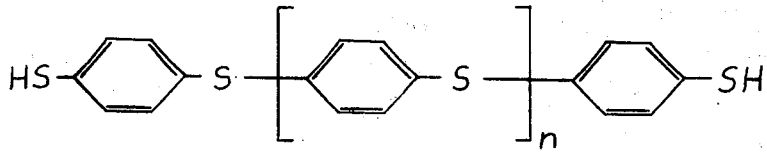

wherein $n$ in said initial state is from 6 to 12.

* * * * *